US006882084B2

(12) United States Patent
Johansson et al.

(10) Patent No.: US 6,882,084 B2
(45) Date of Patent: Apr. 19, 2005

(54) ELECTROMAGNETIC DRIVE UNIT

(75) Inventors: Stefan Johansson, Uppsala (SE); Christer Mattsson, Norrtälje (SE)

(73) Assignee: Piezomotor Uppsala AB, Uppsala (SE)

(*) Notice: Subject to any disclaimer, the term of this patent is extended or adjusted under 35 U.S.C. 154(b) by 0 days.

(21) Appl. No.: 10/460,258

(22) Filed: Jun. 13, 2003

(65) Prior Publication Data

US 2004/0251782 A1 Dec. 16, 2004

(51) Int. Cl.[7] .................................................. H01J 41/08
(52) U.S. Cl. .................................................. 310/323.02
(58) Field of Search ............................ 310/328, 323.02, 310/332, 331, 323.16; H01L 41/08

(56) References Cited

U.S. PATENT DOCUMENTS 5,049,775 A 9/1991 Smits
5,089,740 A * 2/1992 Ono ............................ 310/328
5,170,089 A * 12/1992 Fulton ......................... 310/328
5,598,050 A 1/1997 Bowen et al.
5,917,271 A 6/1999 Yamamura
6,242,846 B1 * 6/2001 Ashizawa et al. ..... 310/323.02
6,242,850 B1 * 6/2001 Slutskiy et al. ............. 310/328
6,437,485 B1 * 8/2002 Johansson ................... 310/332
2002/0074901 A1 6/2002 Johansson

* cited by examiner

*Primary Examiner*—Thomas M. Dougherty
*Assistant Examiner*—Karen Beth Addison
(74) *Attorney, Agent, or Firm*—Young & Thompson

(57) ABSTRACT

An electromechanical motor (1) has a driving element (20) comprising two electromechanical vibrators (22, 24). The two electromechanical vibrators (22, 24) are interconnected by a link member (26). The electromechanical vibrators (22, 24) are, at the ends (21, 23) connected to the link (26), attached to a backbone (12) of a stator (10) by a respective resilient joint member (14, 16). A mechanical connection to the backbone (12) is thus introduced essentially between the vibrator (22, 24) and the link (26). A vibration of one of the electromechanical vibrators (22, 24) is transferred into a tilting or torsion of one of the joint members (14, 16), and a similar vibration of the other electromechanical vibrator (22, 24) provides a tilting or torsion of the other joint member (14, 16). The liner (26), interconnecting the vibrators (22, 24) is subsequently caused to deform and move. Depending on the vibrations and their relative phases, an actuating portion (28) of the link (26) can be brought along a motion path and this can in turn be used to interact with a body to be moved.

19 Claims, 7 Drawing Sheets

4 5 6 20 2 26 3 28 22 21 14 4 5 16 23 24 12 10 1

ELECTROMAGNETIC DRIVE UNIT

TECHNICAL FIELD

The present invention relates in general to electromechanical actuators and in particular to small electromechanical actuators operating at or close to a resonance frequency.

BACKGROUND

There are numerous general technical applications with the need for extremely miniaturized motors that are able to make controlled fine-positioning. Among these, portable consumer devices, such as e.g. cameras, have additional demands for low power consumption, low weight and price. The required motion is typically linear but often a rotating motor combined with a motion-converting mechanism such as a lead-screw is used. The motion range is often in the order of millimetres. The demands described above are difficult to satisfy simultaneously by one and the same motor design.

Generally, the use of a solid actuator material and some type of magnification mechanism appear to be the best solution for the desired miniature motors. A solid actuator such as a PZT element has a very high energy density and the size of a motor could therefore be made very small. Typically, existing actuator materials with high energy density are not able to change its shape more than a tenth of a percent, which makes it difficult to make an optimised construction with small external dimensions. Many different solutions have been proposed in prior art. A few typical examples are discussed below.

In U.S. Pat. No. 6,373,170, two separate actuator blocks supported on a backbone and inclined with a given angle relative to each other, uses an interlinking drive pad to drive a rail. The actuators are operating with a so-called 33-actuation.

The overall V-shaped unit extends perpendicular to the moving rail. The two actuators are driven in a longitudinal mechanical resonance with a phase shift between the two actuators giving an elliptical trajectory of the drive pad. When making the components small, in the order of a few millimetres, longitudinal resonance frequencies will occur in the vicinity of the MHz range. In many applications, such frequencies will give rise to electromagnetic interference and will not be accepted. It is also practically difficult to operate devices at such frequencies.

One component that has been used in numerous applications is a piezoelectric bimorph element since a high internal motion magnification can be achieved in a bending mode. A motor intended for applications, which demand extremely small sizes, was constructed and presented in the Swedish patent SE9300305-1. Rotation or linear translation is performed by stepwise motion with bimorph elements in direct contact with the object to be moved. In this invention, the bimorph elements are driven in such a way that the contact point of the bimorph element moves in two dimensions, i.e. the bimorph is used both in the bending and the longitudinal direction.

In the German patent DD 143 682, a piezoelectric stick-slip motor is disclosed. Two bimorphs consisting of a steel/piezoelectric element sandwich are connected at respective first ends to a backbone part of the stator and at respective second ends by an intermediate passive steel part. A lever connected to the passive part act on a wheel to be driven. The in-phase bending of the bimorphs is used for driving the wheel while the out-of-phase bending of the bimorphs rotates the passive part and varies the contact pressure on the wheel.

In the U.S. Pat. No. 5,089,740 a driving mechanism based on bimorphs is disclosed. A complex gate-shaped arrangement of bimorphs with coupled motion patterns is presented, which has a relatively high rigidity. However, the entire arrangement is space consuming, and using parts of the arrangement will remove the advantages of the coupled motions.

In U.S. Pat. No. 6,437,485, an actuator arrangement suitable for limited lateral space around a body to be driven is disclosed. One actuator beam, comprising several electrodes and arranged substantially parallel to the body, operates with 31-actuation close to a fundamental resonance frequency. The beam is supported against a base substantially at the ends, and a single drive pad is arranged in the centre of the beam. An asymmetric supply of voltages to the two sides of the beam and a frequency slightly off-resonance are used to achieve a two-dimensional trajectory of the drive pad. The advantages with this arrangement are many. It requires very small lateral space in the vicinity of the body, the use of a single drive pad enables long strokes and the near-resonance operation reduces electronics requirements. However, it is relatively difficult to achieve a sufficient efficiency. It may also be difficult to "tune" the actuator to a certain resonance frequency since the resonance frequency typically depends on the normal force, i.e. the force with which the body is pressed against the drive pad.

SUMMARY

It is an object of the present invention to provide electromechanical actuator systems suitable for miniaturizing, and in particular having a small lateral extension. A further object of the present invention is to provide electromechanical actuator systems possible to operate without causing electromagnetic radiation interference. Another object of the present invention is to provide electromechanical actuator systems having improved efficiency and actuating force. Yet another object of the present invention is to provide electromechanical actuator systems being more insensitive for load changes.

The above objects are achieved by actuator systems according to the enclosed patent claims. In general, two electromechanical vibrators are interconnected by a link. The electromechanical vibrators are, at the ends connected to the link, attached to a backbone of a stator by a respective resilient joint member. A mechanical connection to the backbone is thus introduced essentially between the vibrator and the link. A vibration of one of the electromechanical vibrators is transferred into a tilting or torsion of one of the joint members, and a similar vibration of the other electromechanical vibrator provides a tilting or torsion of the other joint member. The link, interconnecting the vibrators is subsequently caused to deform and move. Depending on the vibrations and their relative phases, an actuating portion of the link can be brought along a motion path and this can in turn be used to interact with a body to be moved.

The advantage of the present invention is that a more controlled motion pattern of the actuating portion is achieved, in particular concerning stability and frequency adjusting possibilities.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention utilizes a tilting or torsion motion to create a movement of an actuating member. In order to visualize the underlying ideas, FIGS. 1A–E illustrate the basic principles.

Figure 1A:
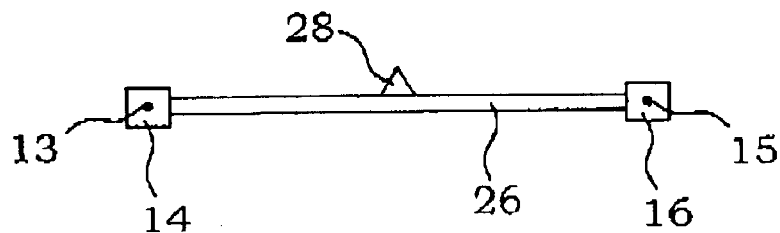
FIGS. 1A–E are schematic drawings of the relationship between tilting and translation motion of a link member according to basic principles of the present invention.

FIG. 1A illustrates a link member 26 having an actuating portion 28 intended to be in interaction with a body to be moved. The link member 26 is made of a material or designed in a geometrical shape that allows a certain degree of resilience. Typically, the link member 26 is made of a non-electromechanical material or electromechanical material that is not possible to activate by applying voltages. The ends of the link member 26 are rigidly attached to two joint members 14 and 16, respectively. The joint members 14, 16 present torque resilience around a respective axis 13, 15 perpendicular to the plane of the paper in FIG. 1A. In this particular example, the joint members 14, 16 are however fixed against translation displacements.

Figure 1B:
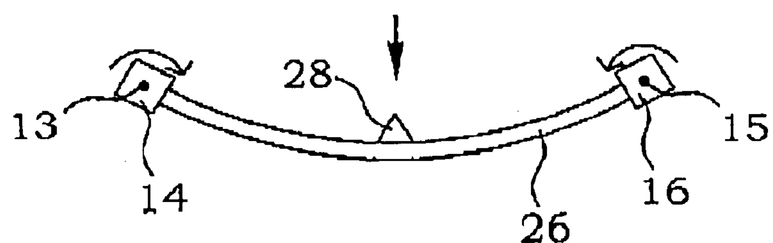

In FIG. 1B, a torque is applied on the joint member 16 in a clockwise direction and another torque is applied on the joint member 14 in a counterclockwise direction. This causes the joint members 14, 16 to turn somewhat towards the center, i.e. towards the link member 26. The turning of the joint members 14, 16 forces the link member 26 and thereby the actuating portion 28 to move downwards in the figure, as indicated by an arrow. If the arrangement is symmetric and the applied torques are equal, the link member 26 bends downwards in a symmetrical manner and the motion of the actuating portion 28 will therefore be a pure translation, without involving any tilting actions.

Figure 1C:
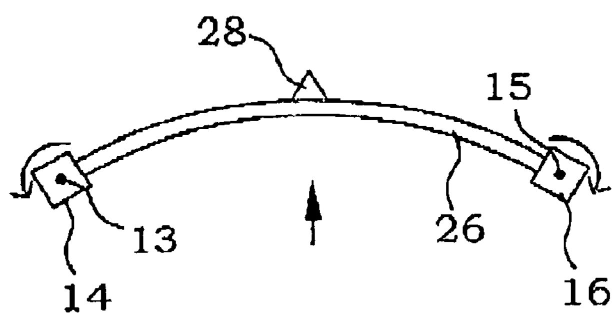

In FIG. 1C, torques are applied in an opposite manner as compared with FIG. 1B, which causes the link member 26 to bend upwards and displace the actuating portion 28 upwards, which is indicated by an arrow. Application of opposite directed torques on the joint members 14, 16 will therefore cause a up-and-down motion of the actuating portion 28.

Figure 1D:
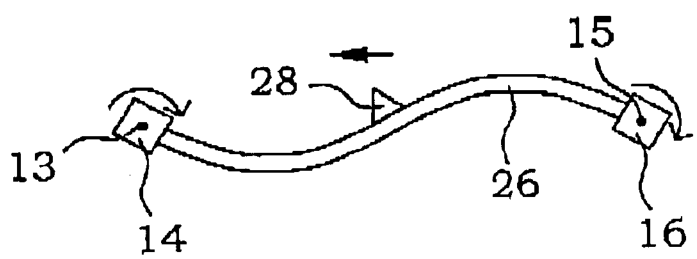

In FIG. 1D, torques directed in the same direction are applied to the joint members. In this figure, clockwise directed torques are applied. link member 26 will also in this case be deformed, now in an S-shaped form. The center of the link member will be tilted to the left in the figure, resulting in a translation motion of the tip of the actuating portion 28 to the left.

Figure 1E:
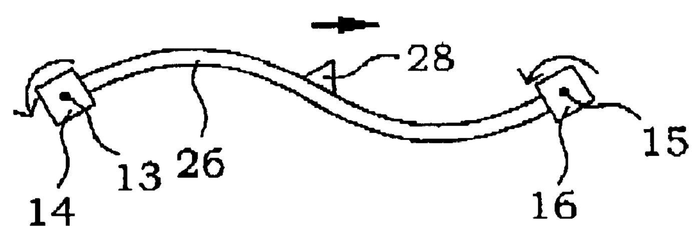

In FIG. 1E, opposite directed torques as compared with FIG. 1D are applied, which translates the tip of the actuating portion 28 to the right. Application of similarly directed torques on the joint members 14, 16 will therefore cause a left-and-right motion of the actuating portion 28.

By combining these alternatives, almost any motion pattern of the actuating portion 28 can be achieved. In particular, the actuating portion can be brought along an elliptical path, which is the common motion used for creating the operational motions of an electromechanical motor.

Figure 2:
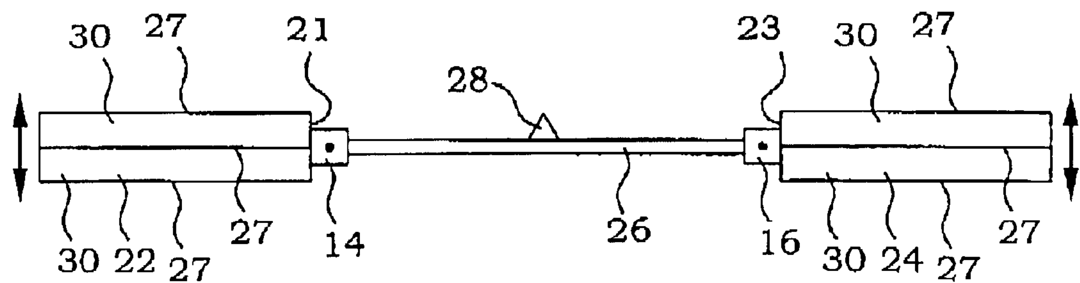
FIG. 2 is a schematic drawing of an embodiment of a driving element according to the present invention.

FIG. 2 illustrates the basic idea of the present invention by an embodiment of a driving element in an electromechanical motor. As in FIGS. 1A–E, a link member 26, an actuating portion 28 and two joint members 14, 16 are provided. To each joint member 14, 16 is a respective electromechanical vibrator 22, 24 rigidly attached. A first electromechanical vibrator 22 is attached at a first end 21 thereof to the joint member 14. A second electromechanical vibrator 24 is attached at a first end 23 thereof to the joint member 16. By creating a bending mode vibration in the electromechanical vibrators 22, 24, i.e. a vibration having its strokes substantially perpendicular to the main extension of respective electromechanical vibrator, a torque will be applied onto respective joint member 14 and 16, respectively. The free ends of the respective electromechanical vibrator 22, 24 behave more or less as vibrating free beams.

In most prior-art electromechanical motors, the translation of electromechanical elements are typically used for creating the motion of an actuating portion. In the present invention, the electromechanical vibrators 22, 24 are instead used to transfer a torque onto a joint member 14, 16 and thereby indirectly creating a motion of an actuating portion 28. The electromechanical vibrators 22, 24 are therefore in the present invention attached to any stator backbone part, as described more in detail below, in the vicinity of the end closest to the actuating portion 28, in contrary to most prior-art designs.

In the embodiment illustrated in FIG. 2, the electromechanical vibrators 22, 24 are bimorphs of piezoelectric material provided with electrodes 27. By applying different voltages over the different piezoelectric layers, the electromechanical vibrators 22, 24 are caused to bend according to well-known techniques. By applying alternating voltages, the electromechanical vibrators 22, 24 are subsequently caused to vibrate in a bending mode. This bending vibration will be transferred into a tilting or torsion motion of the joint members 14, 16, which in turn in a cooperative manner will impose a motion to the link member 26 and its actuating portion 28.

Figure 3A:
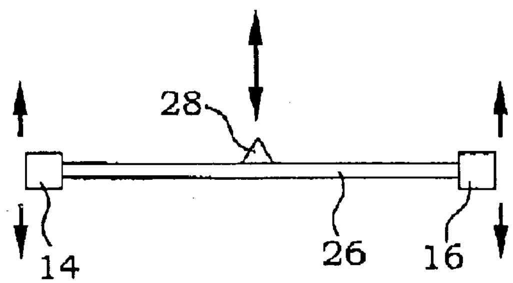
FIGS. 3A–C are schematic drawings of the relationship between translation of the ends and the center of a link member.
Figure 3B:
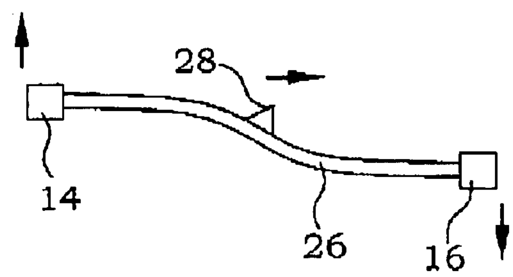
Figure 3C:
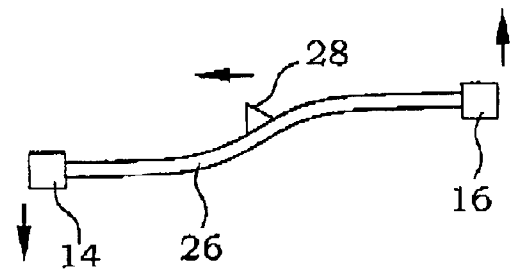

In a practical case, the joint members 14, 16 are often not perfectly rigid against translations. A vibration of the electromechanical vibrators 22, 24 will in such a case also cause the joint members 14, 16 to be somewhat translated in the up-and-down direction. However, such motion can, as illustrated by FIGS. 3A–C, also be transformed in controlled motions of the actuating portion 28.

Figure 4:
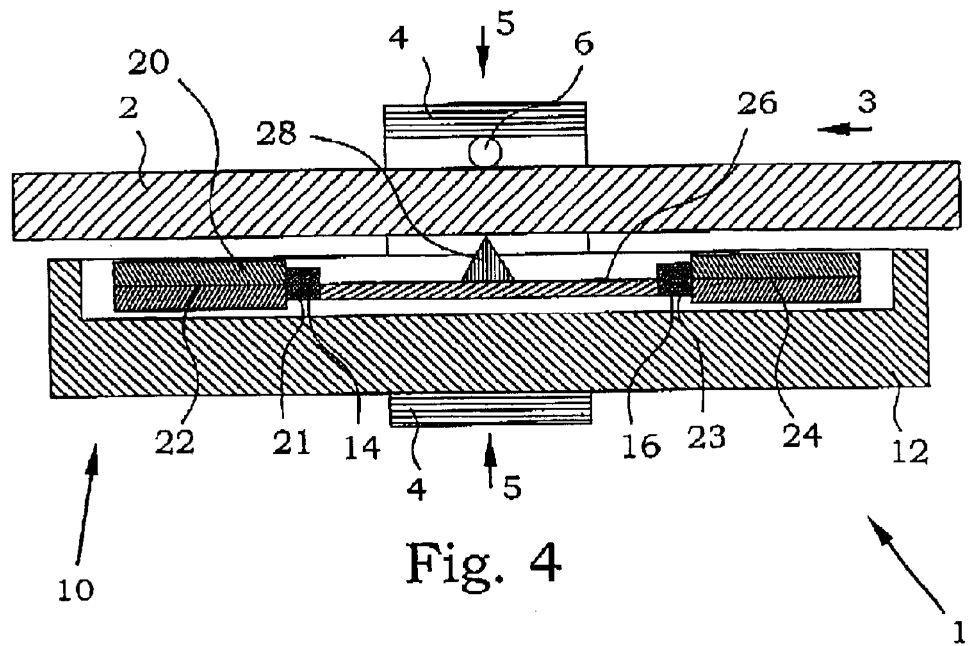
FIG. 4 is a schematic cross sectional view of an embodiment of an electromechanical motor according to the present invention.

In FIG. 4, an embodiment of an electromechanical motor 1 according to the present invention is illustrated. The electromechanical motor 1 comprises a stator 10 and a body 2 to be moved. An arrow 3 indicates a displacement direction of the body 2 relative to the stator 10. The stator 10 comprises a backbone portion 12 and a driving element 20. The driving element 20 comprises two electromechanical vibrators 22, 24 and a link member 26. The electromechanical vibrators 22, 24 are elongated and extend substantially parallel to the displacement direction 3. The electromechanical vibrators 22, 24 are at a respective first end 21, 23 rigidly connected to the link member 26, i.e. the respective first ends 21, 23 constitutes a first attachment point and a second attachment point, respectively, between the electromechanical vibrators 22, 24 and the link member 26. The backbone portion 12 is attached to the driving element 20 by two resilient joint members 14, 16. These resilient joint members 14, 16 are positioned in the vicinity of the first and second attachment points, respectively.

The resilient joint members 14, 16 can also constitute the actual mechanical attachment between the electromechanical vibrators 22, 24 and the link member 26. As described further below, in certain embodiments, a part of the electromechanical vibrators 22, 24, a part of the link member 26 and the joint members 14, 16 can be manufactured as one integrated piece.

The driving element 20 is pressed against the body 2 with a normal force 5 by resilient means 4 via the backbone portion 12 and a linear bearing means 6.

In FIG. 4, joint members 14, 16 extend into the figure plane to the backbone structure creating torque resilience and supporting the drive element. This solution works well when the thickness of the whole motor should be reduced. If the lateral dimensions are important, i.e. the extension perpendicular to the figure plane is crucial, it is more advantageous to support the joint member underneath the drive element, i.e. on the opposite side of the actuating portion. A simple but functional solution is a polymer ridge, e.g. a ridge made of glue, on the backbone structure.

Figure 5:
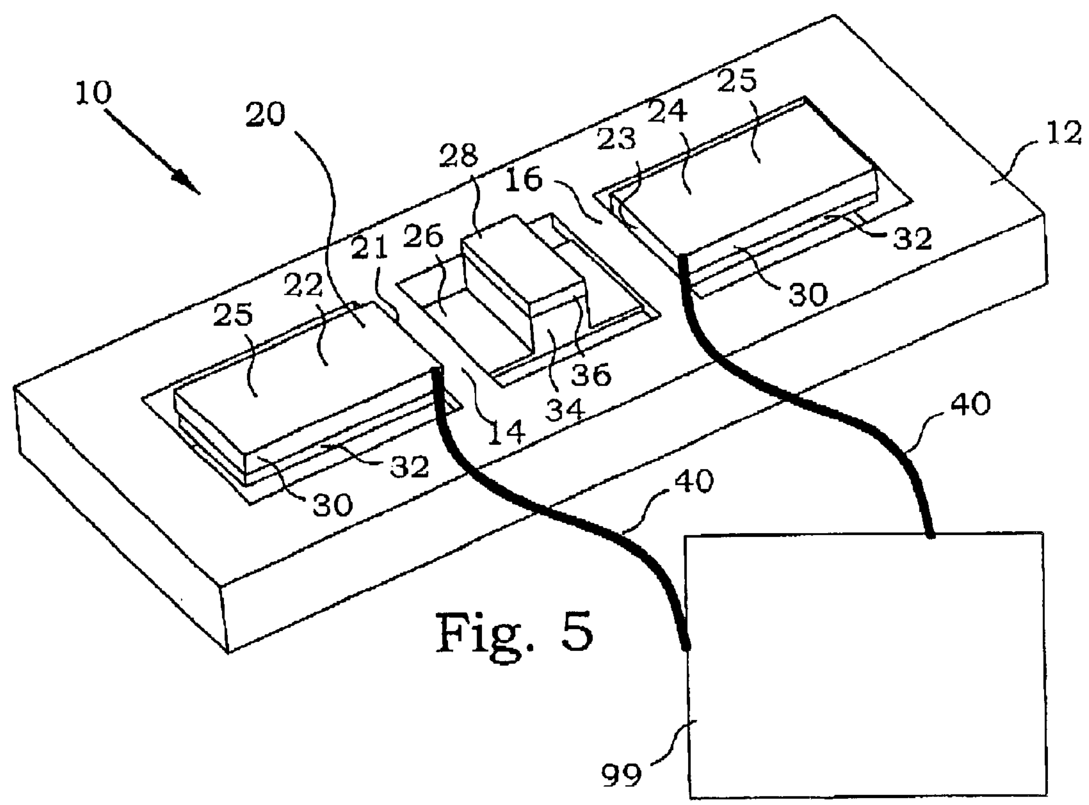
FIG. 5 is a perspective view of an embodiment of a stator of an electromechanical motor according to the present invention.

FIG. 5 is a perspective view of the stator 10 of an embodiment of an electromechanical motor according to the present invention. The backbone 12 of the stator 10 is in this embodiment made of a relatively rigid metal sheet. In the metal sheet holes and depressions are machined according to the further description below. The joint members 14, 16 are in this embodiments bridges of the metal block between the two sides of the backbone 12, which bridges are made by a smaller thickness than the backbone in order to confer the joint members 14, 16 a certain resilience. This resilience will be a torsion resilience around an axis parallel to the bridges as well as a bending resilience essentially perpendicular to the bridge surfaces.

The metal block is in the present embodiment also used as one part of the electromechanical vibrators 22, 24. A metal layer 32 of approximately the same thickness as for the joint members 14, 16 bridges over openings in the metal block. Onto these metal layers 32, piezoelectric material 30 are provided. On top of the piezoelectric material 30, a thin metallic electrode layer 25 is provided. This electrode 25 is electrically connected by connections 40 to a voltage control unit 99, i.e. a control means, in order to be able to apply a voltage over the piezoelectric material 30. The electromechanical vibrators 22, 24 consist in this embodiment of a monomorph structure of a metal sheet and a piezoelectric layer.

The piezoelectric material 30 could as well be a multilayer ceramic according to conventional techniques. The multilayer electrodes are typically connected on the sides of the piezoelectric material by soldering to a flexible printed circuit board. The flexible printed circuit board can advantageously be an intermediate layer between the metal sheet and the piezoelectric material.

The link member 26 comprises in this embodiment a thin metallic layer 34 machined out from the same metallic block as the backbone 12. The metallic layer 34 extends between the joint members 14, 16. At the middle of the metallic layer 34, an electromechanically passive ceramic material 36 is deposited, forming the actuating portion 28. The relative thin metallic layer 34 enables the link member 26 to bend without need for very high forces.

By applying phase-shifted alternating voltages between respective ones of the electrodes 25 and the backbone metal, the electromechanical vibrators 22, 24 are caused to vibrate with their free ends, but at the game time the vibrations transfer a torque onto the joint members 14, 16, which is subsequently transferred by the bending of the link member 26 into a motion of the actuating portion 28. No phase shift at all will give more or less a pure upward-downward translation, and a phase shift of 180 degrees will give more or less a pure sideward translation. Any phase shifts there between will give rise to an elliptical motion path of the actuating portion 28.

In order to increase the power efficiency of the arrangement, mechanical resonances in the driving element 20 are preferably used. The up-and-down motion, represented by FIGS. 1B–C, represents one bending vibration mode, while the sideward motion, represented by FIGS. 1D–E, represents another bending vibration mode. In a general case, these two bending modes have different resonance frequencies. However, by modifying the geometrical design, e.g. the length and thickness of the link member 26 or the lengths of the electromechanical vibrators 22, 24, as well as adjusting the resilient properties of the joint members 14, 16, the resonance frequencies can be modified. In certain applications, the resonance frequencies can be brought very close to each other, and the overall efficiency can thereby be increased considerably.

The up-and-down motion is in a typical case responsible only for the release of the actuating portion from the body, when returning to the original position. In many applications, it is sufficient with a relatively small motion in this direction. The sideward motion is in such cases more important and the operation frequency is then preferably selected to be close to the sideward resonance frequency.

Figure 6:
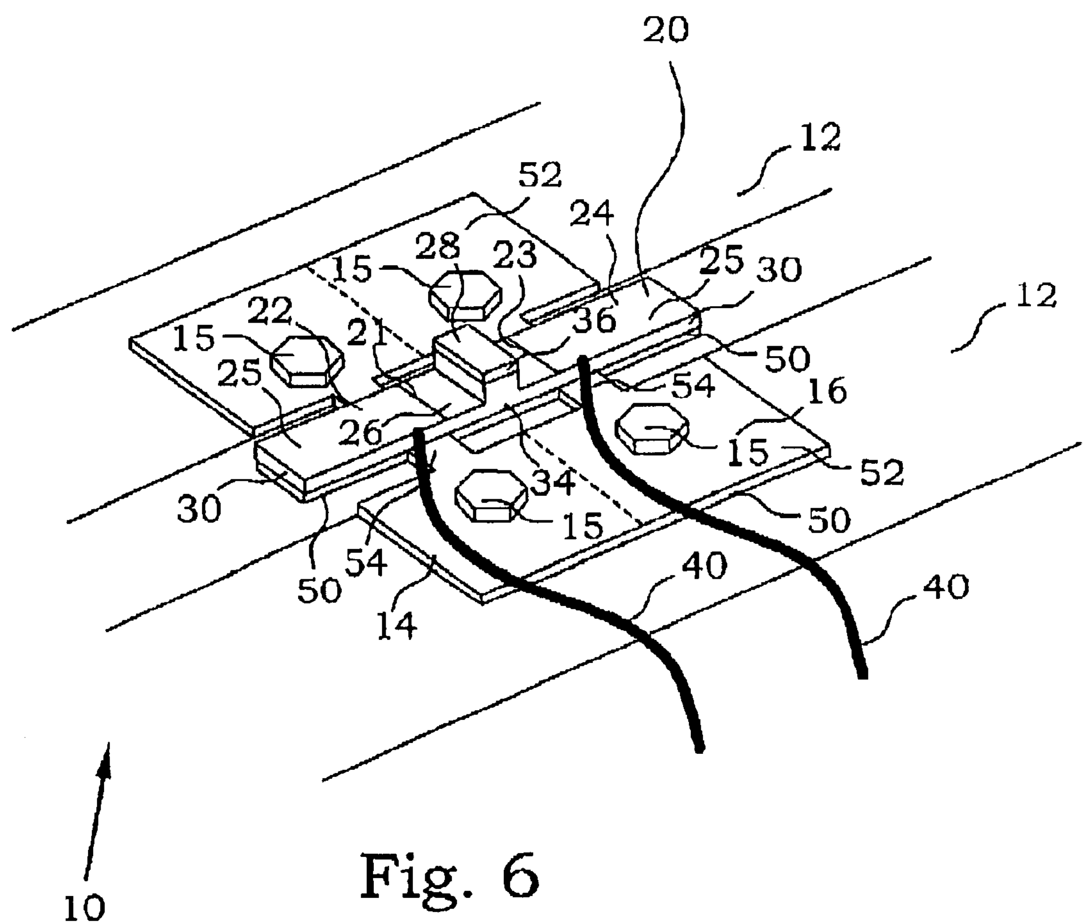
FIG. 6 is a perspective view of another embodiment of a stator of an electromechanical motor according to the present invention.

FIG. 6 illustrates another embodiment of a stator 10 of an electromechanical motor according to the present invention. This embodiment enables a simple manufacturing process, but may be somewhat less stable in operation than the embodiment of FIG. 5. Here the backbone 12 comprises two solid blocks of metal. Part of the vibrators 22, 24, part of the link member 26 and the joint members 14, 16 are in this embodiment made from a thin uniform metallic sheet 50. The joint members 14, 16 are formed together in one piece, comprising the actual joint portions 54 as well as attachment flanges 52 on each side of the joint portions. Holes are provided in the attachment flanges 52, through which bolts 15 are inserted and fastened into the backbone block 12.

The metallic sheet 50 also constitutes the base layer of the electromechanical vibrators 22, 24. Onto this base, piezoelectric material 32 is deposited, forming a monomorph. Finally, an electrode sheet 25 is provided on top of the piezoelectric material 32 and connected to connectors 40. The piezoelectric material 32 is in is embodiment deposited all the way from the outer end of the first electromechanical vibrator 22 to the outer end of the second electromechanical vibrator 24. However, by restricting the electrode layer 25 not to pass the position of the joint members, a center portion 35 of piezoelectric material becomes passive. A wear-resistant friction layer 36 of other ceramic material is deposited on top of the passive piezoelectric material 35, constituting the actual actuating portion 28.

Besides the ease of manufacturing, the present embodiment has the advantage, that the resonance frequencies can be adjusted somewhat. By simply changing the force or position of the metallic sheet 50 against the backbone, the resilient properties of the joint members 14, 16 will be altered. A coarse adaptation of the resonance frequencies can then be performed by geometric design considerations, and a fine tuning can be performed after assembly of the motor.

Figure 7:
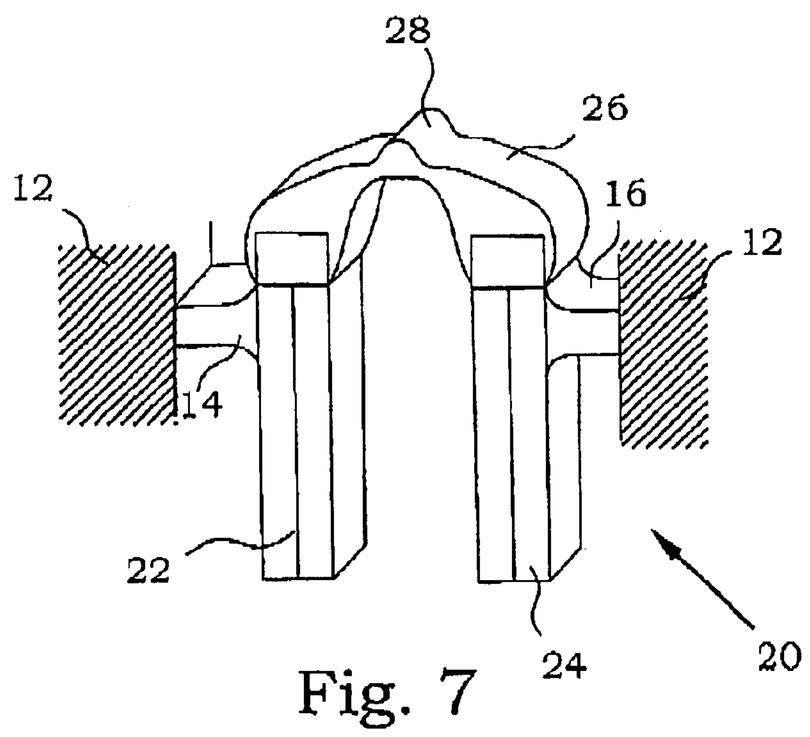
FIG. 7 is a perspective view of yet another embodiment of a driving element of an electromechanical motor according to the present invention.

The embodiments described above have been designed for systems where the lateral space around the body to be moved is limited. However, also other geometries are possible within the scope of the present invention. FIG. 7 illustrates a driving element 20 having the electromechanical vibrators 22, 24 directed essentially perpendicular to a main displacement direction 3. The electromechanical vibrators 22, 24 are also here interconnected by a link member 26 having an actuating portion 28. At the same end of the electromechanical vibrators 22, 24 as being connected to the link member 26, joint members 14, 16 mechanically connect the driving element 20 to a stator backbone 12.

The link member 26 will in this embodiment experience a buckling distortion and/or a tilting motion depending on the relative phases of the voltages applied to the electromechanical vibrators 22, 24.

Figure 10:
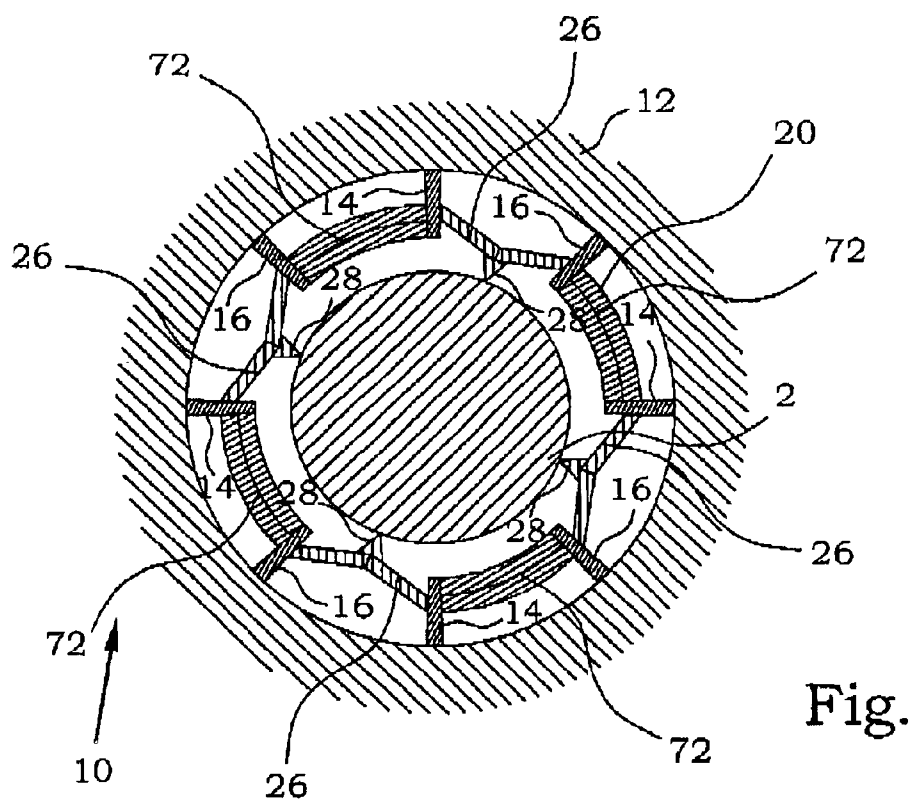
FIG. 10 is a schematic cross sectional view of an embodiment of an electromechanical motor creating a rotational motion according to the present invention.

Normally it is more difficult to create linear motion and therefore the embodiments explained in more detail above have illustrated the present invention in linear applications. It is of course possible to use similar arrangements for rotating motion. One solution is to use several drive elements placed at the periphery of a rotor and where the actuating portion drives in the tangential direction. Another solution is illustrated in FIG. 10. A drive element 20 constituting a circular continuous member consists of several link members 26 and vibrators 72. Vibrators 72 are oriented in parallel with the rotor plane, i.e. the interacting surface of the body 2 to be moved, and are attached in both ends to joint members 14, 16. When using 4 vibrators 72, the phase shifts between them will typically be 0, 90, 180 and 270 degrees. The actuating portions 28 will then drive with a phase shift of 90 degrees relative the neighboring actuating portions. This construction resembles a traveling wave motor but in contrast to the traveling wave motors there are several well-defined joint members 14, 16 attached to the backbone 12 and well separated link members 26 with actuating portions 28.

Figure 11:
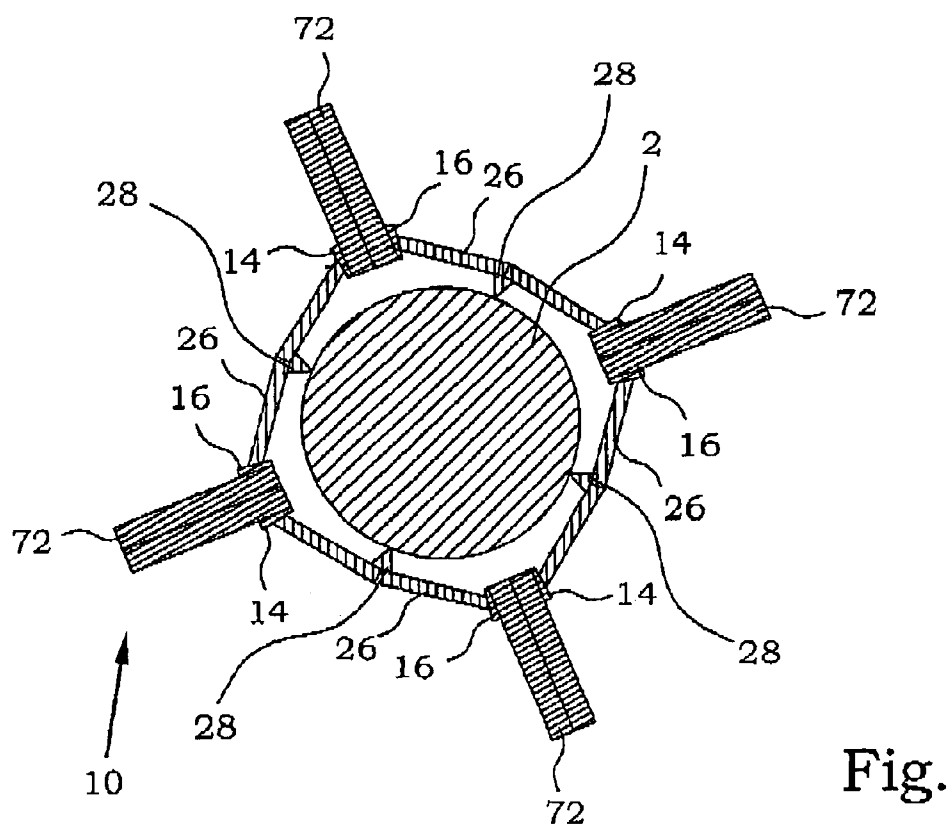
FIG. 11 is a schematic cross sectional view of another embodiment of an electromechanical motor creating a rotational motion according to the present invention.

The vibrators 72 could as well be oriented perpendicular to the rotor 2 plane and in this case one and the same end of the vibrator 72 may be attached to two joint members 14, 16 as sketched in FIG. 11. The actuating portions 28 could also be arranged to interact with a rotor surface substantially perpendicular to the rotor axis.

Figure 8:
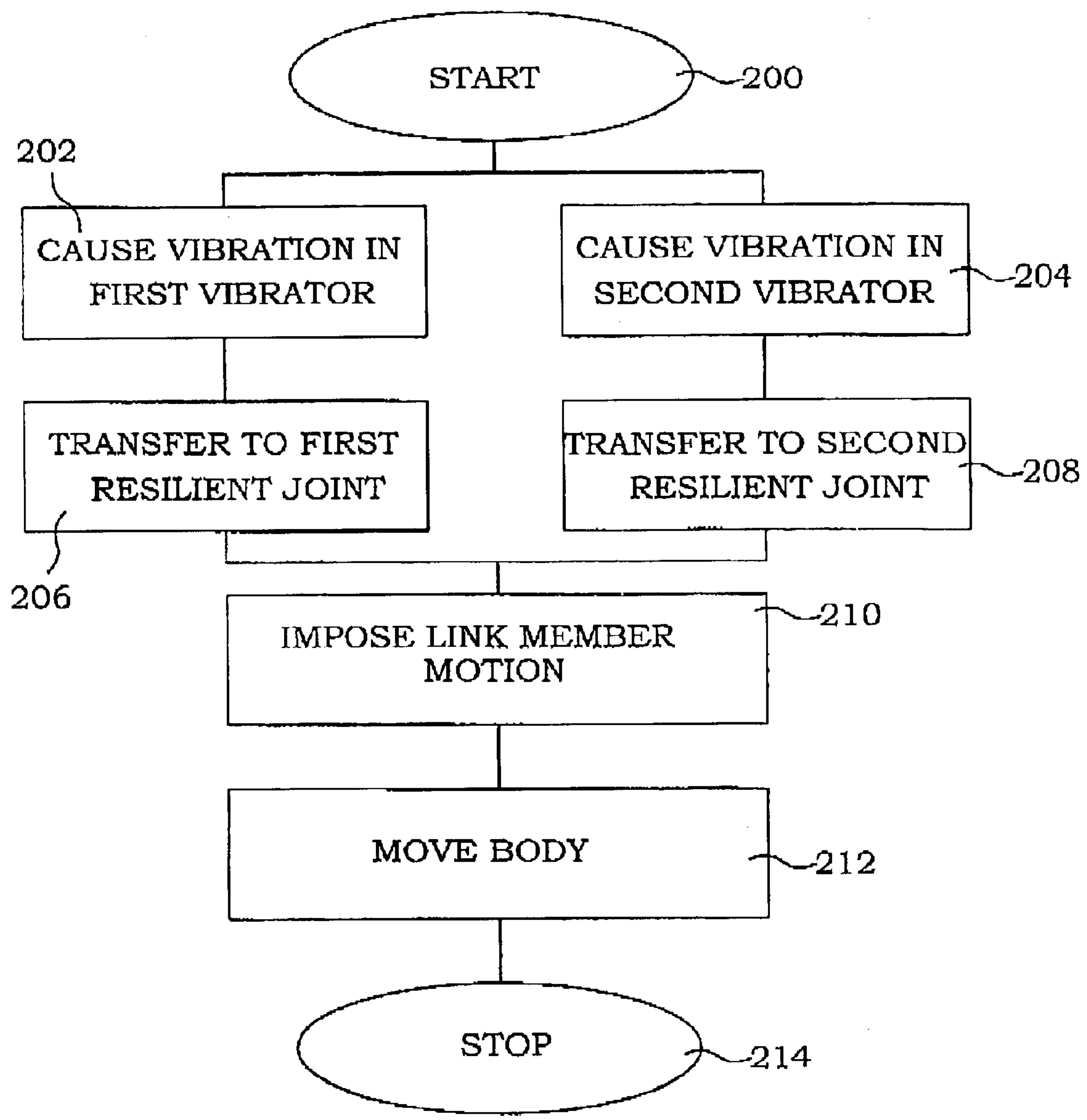
FIG. 8 is a flow diagram of an embodiment of a method according to the present invention.

In FIG. 8, a flow diagram illustrating the basic concepts of a method according to the present invention is illustrated. The method is basically a continuous and simultaneous performance of a number of steps, which schematically are illustrated in a traditional flow diagram. The procedure starts in step 200. In step 202 a vibration is caused in a first electromechanical vibrator, and in parallel, in step 204, a vibration is caused in a second electromechanical vibrator. These vibrations are preferably caused by applying alternating voltage signals over electromechanically active elements in the vibrators. In step 206, the vibration of the first electromechanical vibrator is transferred into a resilient motion of a first joint member, and in parallel, in step 208, the vibration of the second electromechanical vibrator is transferred into a resilient motion of a second joint member. Together, these resilient motions impose a motion of an actuating portion of a link member in step 210. A body is caused to move in step 212 by letting the moving actuating portion interact with the body surface. The procedure is ended in step 214.

Figure 9A:
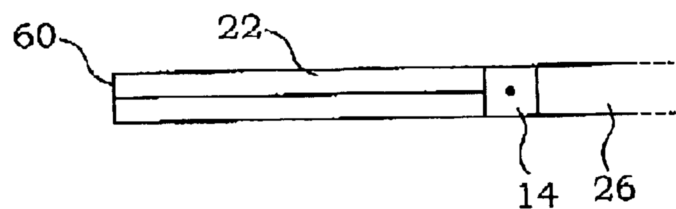
FIGS. 9A–D are a schematic drawings different embodiments of electromechanical vibrators of an electromechanical motor according to the present invention.
Figure 9B:
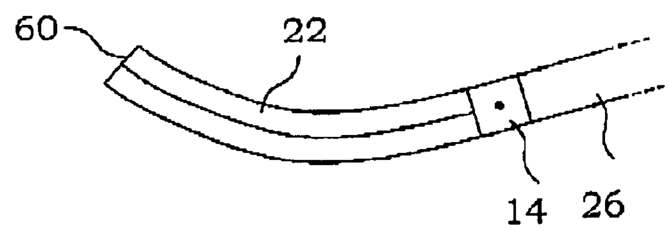
Figure 9C:
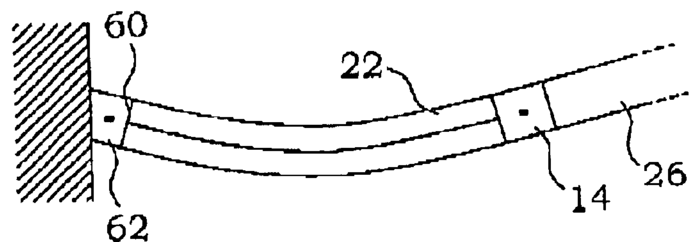

In the above embodiments, the electromechanical vibrators are only mechanically attached to the backbone by the resilient joint members between the vibrators and the link member, as illustrated in FIG. 9A. (only half the driving element is shown.) An outer end 60 of the vibrator 22 is thereby allowed to vibrate freely, as illustrated by FIG. 9B. Such an arrangement gives rise to certain bending mode vibrations, which may be used for driving a body. However, also other vibration modes may be useful in other applications. In FIG. 9C, the "outer" end 60 of the vibrator 22 is attached to the backbone 12 by a bendable joint 62, The bendable joint 62 allows the outer end to be tilted with respect to the backbone surface, but not removed therefrom. Such an arrangement will give rise to another set of vibrational states.

Figure 9D:
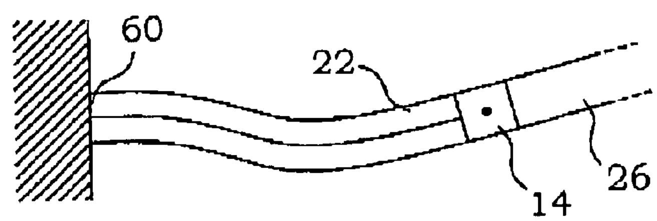

Furthermore, as illustrated by FIG. 9D, the outer end 60 of the vibrator could also be rigidly fastened to the backbone 12, which will give rise to yet another set of vibrational modes. In this way it is possible to tailor the set of vibrations that are used to move the actuating portion 28.

The vibrators 22, 24 can also be provided with motion restrictions, not only at the outer end, but also at any intermediate position along the vibrator. This will in different ways alter the available vibrational modes.

It will be understood by those skilled in the art that various modifications and changes may be made to the present invention without departure from the scope thereof, which is defined by the appended claims. In particular, different parts of the illustrated embodiments can be combined in different configurations.

What is claimed is:

1. Electromechanical motor, comprising:

stator, having a driving element and a backbone portion;

said driving element in turn comprising a first electromechanical vibrator and a second electromechanical vibrator interconnected by a link member at a first and second attachment point, respectively;

said link member having an actuating portion for interaction with a body to be moved;

said driving element being attached to said backbone portion by a first resilient joint member in the vicinity of the first attachment point and a second resilient joint member in the vicinity of the second attachment point.

2. Electromechanical motor according to claim 1, further comprising control means for applying alternating voltage signals over electromechanically active portions of said first and second electromechanical vibrators independently of each other.

3. Electromechanical motor according to claim 2, wherein said control means is to arranged to apply alternating voltage signals exciting independent mechanical vibrations in said first and second electromechanical vibrators with strokes substantially perpendicular to a respective main extension of said first and second electromechanical vibrators.

4. Electromechanical motor according to claim 3, wherein said first joint member is arranged to provide torsion resilience around an axis substantially perpendicular to said strokes.

5. Electromechanical motor according to claim 3, wherein said first joint member is arranged to provide bending resilience in a direction substantially parallel to said strokes.

6. Electromechanical motor according to claim 3, wherein two vibration modes of said driving element have substantially the same resonance frequency.

7. Electromechanical motor according to claim 1, wherein an end of said first electromechanical vibrator being opposite to said first attachment point is free from mechanical contacts with said backbone.

8. Electromechanical motor according to claim 1, wherein an end of said first electromechanical vibrator being opposite to said first attachment point is attached to said backbone by a bendable joint.

9. Electromechanical motor according to claim 1, wherein an end of said first electromechanical vibrator being opposite to said first attachment point is attached to said backbone by a rigid joint.

10. Electromechanical motor according to claim 1, wherein said first and second electromechanical vibrators are arranged substantially parallel to a main displacement direction of said body.

11. Electromechanical motor according to claim 1, wherein said first and second electromechanical vibrators are arranged with a non-negligible angle to a main displacement direction of said body.

12. Electromechanical motor according to claim 1, wherein said body to be moved is a rotor, and said driving element is a continuous member.

13. Electromechanical motor according to claim 12, wherein said continuous member comprises alternately link members and electromechanical vibrators.

14. Method of driving an electromechanical motor, comprising the steps of:

causing a first electromechanical vibrator and a second electromechanical vibrator to vibrate;

transferring said vibration of said first electromechanical vibrator into a resilient motion of a first resilient joint member between said first electromechanical vibrator and a backbone of a stator of said electromechanical motor;

transferring said vibration of said second electromechanical vibrator into a resilient motion of a second resilient joint member between said second electromechanical vibrator and said backbone;

imposing a motion of a link member interconnecting said first and second electromechanical vibrators at a first and second attachment point, respectively, by said resilient motion of said first and second resilient joint members; and moving a body by interaction with an actuating portion of said moving link member;

said first resilient joint member being located in the vicinity of the first attachment point and said second resilient joint member being located in the vicinity of the second attachment point.

15. Method according to claim 14, wherein said step of causing in turn comprises the step of supplying alternating voltage signals over electromechanically active portions of said first and second electromechanical vibrators independently of each other.

16. Method according to claim 15, wherein said vibrations of said first and second electromechanical vibrators have strokes substantially perpendicular to a respective main extension of said first and second electromechanical vibrator.

17. Method according to claim 16, wherein said resilient motions of said first and second resilient joint members comprise torsions around an axis substantially perpendicular to said strokes.

18. Method according to claim 16, wherein said resilient motions of said first and second resilient joint members comprise bending motions in a direction substantially parallel to said strokes.

19. Method according to claim 14, wherein said motion of said body to be moved is a rotation.

* * * * *